United States Patent
Yoon et al.

(10) Patent No.: US 10,253,921 B2
(45) Date of Patent: Apr. 9, 2019

(54) STAND AND DISPLAY DEVICE USING THE SAME

(71) Applicant: LG ELECTRONICS INC., Seoul (KR)

(72) Inventors: Sangho Yoon, Seoul (KR); Jongyun Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/720,089

(22) Filed: Sep. 29, 2017

(65) Prior Publication Data
US 2018/0094766 A1  Apr. 5, 2018

(30) Foreign Application Priority Data

Sep. 30, 2016  (KR) .......................... 10-2016-0126427

(51) Int. Cl.
| | |
|---|---|
| *F16M 11/00* | (2006.01) |
| *F16M 11/06* | (2006.01) |
| *F16M 11/04* | (2006.01) |
| *F16M 13/00* | (2006.01) |
| *F16M 11/20* | (2006.01) |

(52) U.S. Cl.
CPC ........... *F16M 11/06* (2013.01); *F16M 11/041* (2013.01); *F16M 13/005* (2013.01); *F16M 11/2021* (2013.01)

(58) Field of Classification Search
CPC ..... F16M 11/105; F16M 11/2014; A47B 9/04
See application file for complete search history.

(56) References Cited

U.S. PATENT DOCUMENTS

| | | | | |
|---|---|---|---|---|
| 7,226,028 | B2* | 6/2007 | Lin ........................ | F16C 33/102 248/291.1 |
| 8,313,074 | B2* | 11/2012 | Wang .................... | F16M 11/105 248/157 |
| 9,271,572 | B2* | 3/2016 | Fenelon .................. | A47B 9/04 |
| 9,857,021 | B2* | 1/2018 | Yeh ..................... | F16M 11/2014 |

* cited by examiner

*Primary Examiner* — Amy J. Sterling
(74) *Attorney, Agent, or Firm* — Birch, Stewart, Kolasch & Birch, LLP (57) ABSTRACT

There is disclosed a stand comprising a support plate; a swivel plate provided in an upper end of the support plate and configured to horizontally rotate with respect to the support plate; a lubricating pad provided between the support plate and the swivel plate and coupled to the support plate; a screw configured to fasten the swivel plate, the lubricating pad and the support plate to each other; and a guide hole formed in the swivel plate and configured to provide a rotation passage of the screw in the horizontal rotation, so that the stand may realize the swivel structure of the output unit while minimizing the thickness of the support portion and that the height adjusting structure while minimizing the right and left thickness of the neck portion.

18 Claims, 10 Drawing Sheets

Conventional Art

STAND AND DISPLAY DEVICE USING THE SAME

CROSS-REFERENCE TO RELATED APPLICATIONS

This application claims priority to Korean Patent Application No. 10-2016-0126427 filed on Sep. 30, 2016 in Korea, the entire contents of which is hereby incorporated by reference in its entirety.

BACKGROUND OF THE DISCLOSURE

Field of the Disclosure

Embodiments of the present disclosure relate to a stand of which at least one of the angle, height and rotation of an output unit is adjustable, and a display device including the same.

Background of the Disclosure

A display device may be categorized into a hand-held type which can be held by a user in use and a stand type which stands in a specific location in use. Such a stand type display device includes a wall mount type having an output unit mounted on the wall and a stand type having an output unit rested on a stand to be stand on the floor.

The stand type display device needs adjusting the location or the direction of the output unit according to a user's request. To realize that adjustment, the stand type display device may be supported to have a structure configured to facilitate tilt-movement in a vertical direction along the stand, a swivel-movement in a horizontal direction with respect to a flat surface in parallel to the floor and a height-adjusting movement in a perpendicular direction with respect to the floor.

However, the structure for realizing the tilt-movement, the swivel-movement and the height-adjusting-movement unavoidably has to occupy a large volume and increase the weight and also require additional components only to increase expenses.

As a result, there are increasing demands for a display device having a simple structure configured to minimize the increase of the volume and weight and also production cost, while realizing the movements.

SUMMARY OF THE DISCLOSURE

Accordingly, an object of the present invention is to address the above-noted and other problems and to solve the complex sealing structure of the display device mentioned above.

Embodiments of the present disclosure may provide a stand comprising a support plate; a swivel plate provided in an upper end of the support plate and configured to horizontally rotate with respect to the support plate; a lubricating pad provided between the support plate and the swivel plate and coupled to the support plate; a screw configured to fasten the swivel plate, the lubricating pad and the support plate to each other; and a guide hole formed in the swivel plate and configured to provide a rotation passage of the screw in the horizontal rotation.

The screw may comprise a screw head configured to suppress separation of the swivel plate; and an adjusting washer provided between the screw head and the guide hole and configured to be pressable with respect to a perpendicular direction.

The guide hole may be formed in a range of a first angle with respect to the rotation center of the swivel plate.

The stand may further comprise a support neck part fixed to the swivel plate and forming a hollow; and a height adjust portion having one side fixed to the output unit and configured to slidingly move with respect to the hollow of the support neck, and the height adjust portion may comprise a frame defining front and lateral surfaces; and a lubricating rail coupled to right and left outer surfaces of the frame, respectively, and contact with right and left inner surfaces of the support neck part.

The lubricating rail may be provided to partially cover predetermined left and right regions of a front surface and predetermined left and right regions of a rear surface of the frame, and the back-and-forth width of the hollow formed in the support neck part may be equal to that of the height adjust portion.

The lubricating rail may be hooked to the frame.

The stand may further comprise a lubricant applied to an outer surface of the lubricating rail.

The lubricating rail may comprise one or more stepped groove formed in an outer surface along a sliding direction.

The stand may further comprise a plate spring provided in an inner back surface of the support neck part; and a spring guide provided in an inner front surface of the height adjust unit and configured to contact with the plate spring.

The stand may further comprise an upper end fixing part coupled to an upper end of the support neck part and configured to contact with the height adjust portion when the height adjust portion is sliding to the upper end upwardly.

The stand may further comprise a display coupling portion rotatably coupled to the height adjust portion and configured to be tilting in a perpendicular direction.

The support neck part may be tilted a second angle backwardly.

Embodiments of the present disclosure also provide a display device comprising a support plate; a swivel plate provided in an upper end of the support plate and configured to horizontally rotate with respect to the support plate; a lubricating pad provided between the support plate and the swivel plate and coupled to the support plate; a screw configured to fasten the swivel plate, the lubricating pad and the support plate to each other; and a guide hole formed in the swivel plate and configured to provide a rotation passage of the screw in the horizontal rotation; a support neck part fixed to the swivel plate and forming a hollow; a height adjust portion configured to slide in the hollow of the support neck part; a display coupling portion rotatably coupled to the height adjust portion and configured to be tilting in a perpendicular direction; and an output unit detachably coupled to the display coupling part.

The display device may further comprise a coupling part projected from the display coupling portion.

Embodiments of the present disclosure also provide a display device comprising a support neck part forming a hollow; a height adjust portion configured to slide in the hollow of the support neck part; a display coupling portion rotatably coupled to the height adjust portion and configured to be tilting in a perpendicular direction; and an output unit detachably coupled to the display coupling portion, wherein the height adjust portion comprises a frame defining front and lateral surfaces; and a lubricating rail coupled to right and left outer surfaces of the frame, respectively, and contact with right and left inner surfaces of the support neck part.

The display device according to at least one embodiment mentioned above has following effects.

The stand is capable of minimizing the thickness of the support portion while realizing the swivel structure.

Furthermore, the stand is capable of minimizing the right and left thickness of the neck portion, while realizing the height adjusting structure of the stand.

Still further, the stand is capable of performing the swivel movement, the height adjusting movement and the tilting movement of the output unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A display device may be categorized into a hand-held type which can be held by a user in use and a stand type which stands in a specific location in use. Such a stand type display device includes a wall mount type having an output unit mounted on the wall and a stand type having an output unit rested on a stand to be stand on the floor.

The stand type display device needs adjusting the location or the direction of the output unit according to a user's request. To realize that adjustment, the stand type display device may be supported to have a structure configured to facilitate tilt-movement in a vertical direction along the stand, a swivel-movement in a horizontal direction with respect to a flat surface in parallel to the floor and a height-adjusting movement in a perpendicular direction with respect to the floor.

However, the structure for realizing the tilt-movement, the swivel-movement and the height-adjusting-movement unavoidably has to occupy a large volume and increase the weight and also require additional components only to increase expenses.

As a result, there are increasing demands for a display device having a simple structure configured to minimize the increase of the volume and weight and also production cost, while realizing the movements.

Figure 1:
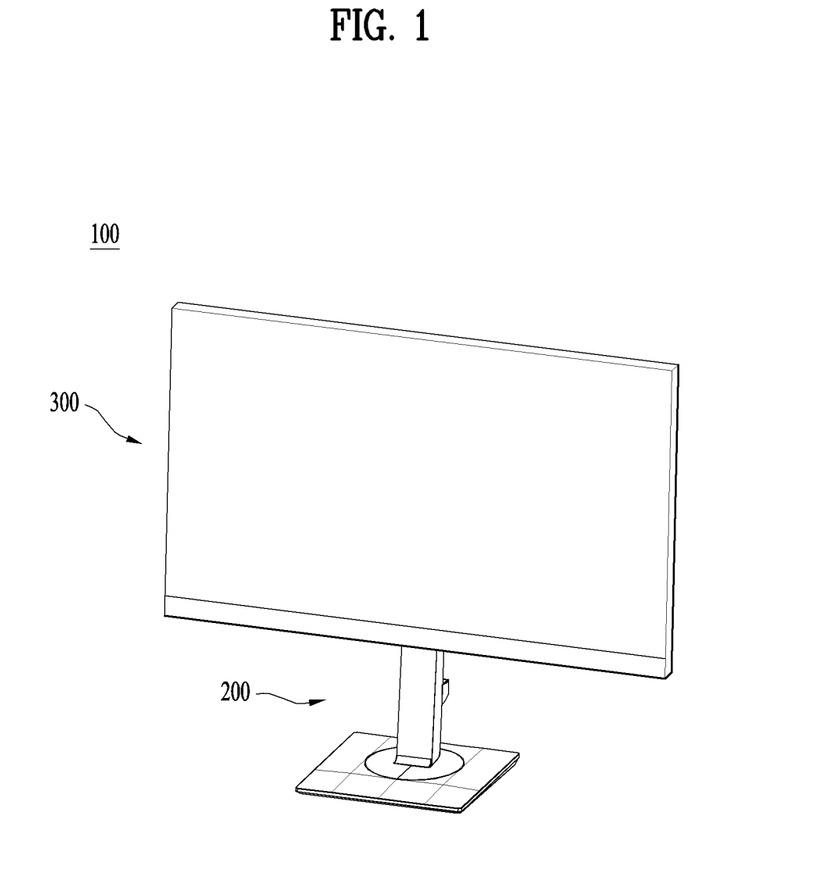
FIG. 1 is a perspective diagram of a display device in accordance with the present disclosure.

FIG. 1 is a perspective diagram of a display device in accordance with the present disclosure.

The display unit 100 basically includes an output unit 300 configured to directly output image information; and a stand 200 which functions to mechanically rest the output unit 300.

The output unit 300 may include basic elements configured of a front case, a display panel, a backlight unit, a frame 231 and a rear case. As occasion occurs, the backlight unit may be omitted.

The stand 200 is provided to secure the output unit 300 to rest it on the floor, by extension, to realize the physical movement of the output unit 300 such as tilt, swivel and height-adjusting movement as mentioned above.

Figure 2:
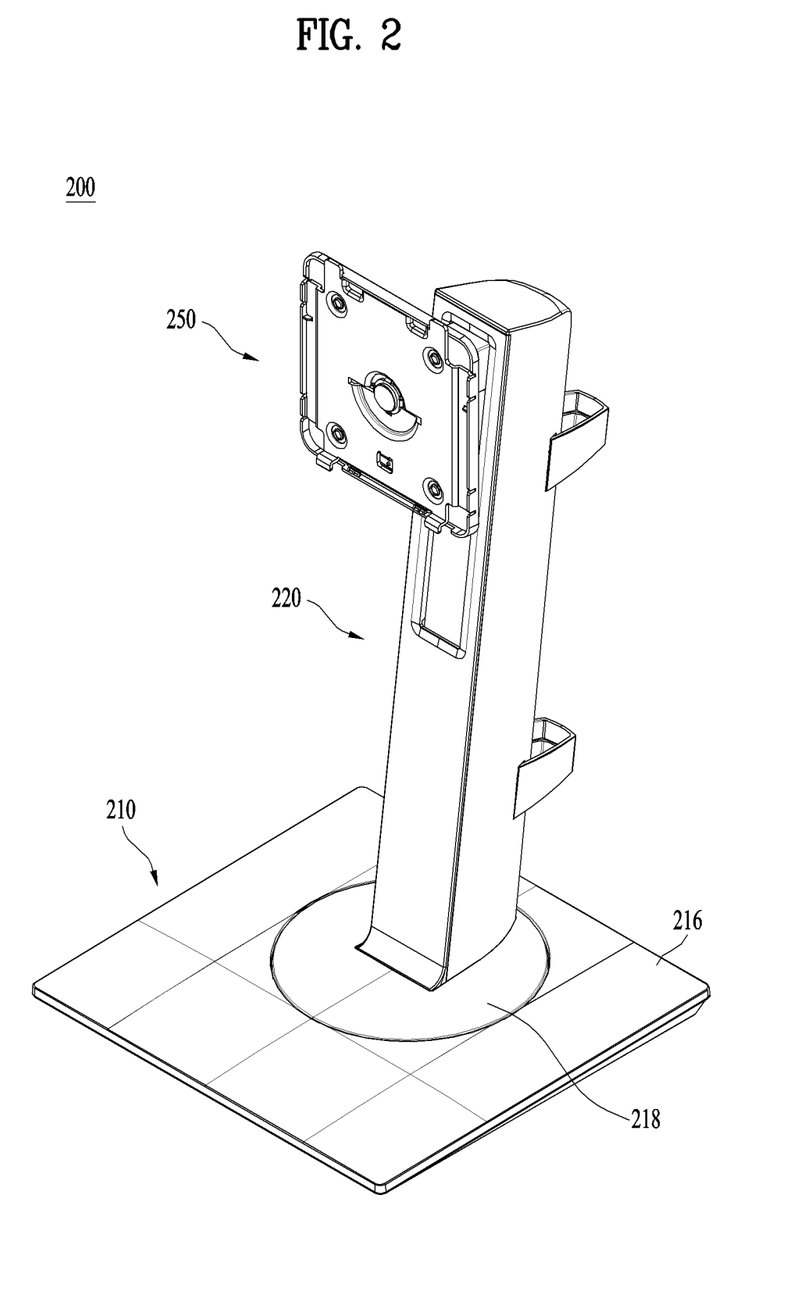
FIG. 2 is a perspective diagram of a stand in accordance with the present disclosure.

FIG. 2 is a perspective diagram of the stand 200.

The stand 200 may include a display coupling portion 250 directly coupled to the output unit (300, see FIG. 1); a neck portion 220 configured to define the height of the output unit (300, see FIG. 1) from the floor; and a support portion 210 which forms the center of the weight in a lower region to stably rest the components including the output unit (300, see FIG. 1).

As mentioned above, the neck portion 220 is rotatable with respect to the support 210 to facilitate the swivel movement of the output unit (300, see FIG. 1). Hereinafter, the structure for facilitating the swivel movement will be described.

Figure 3:
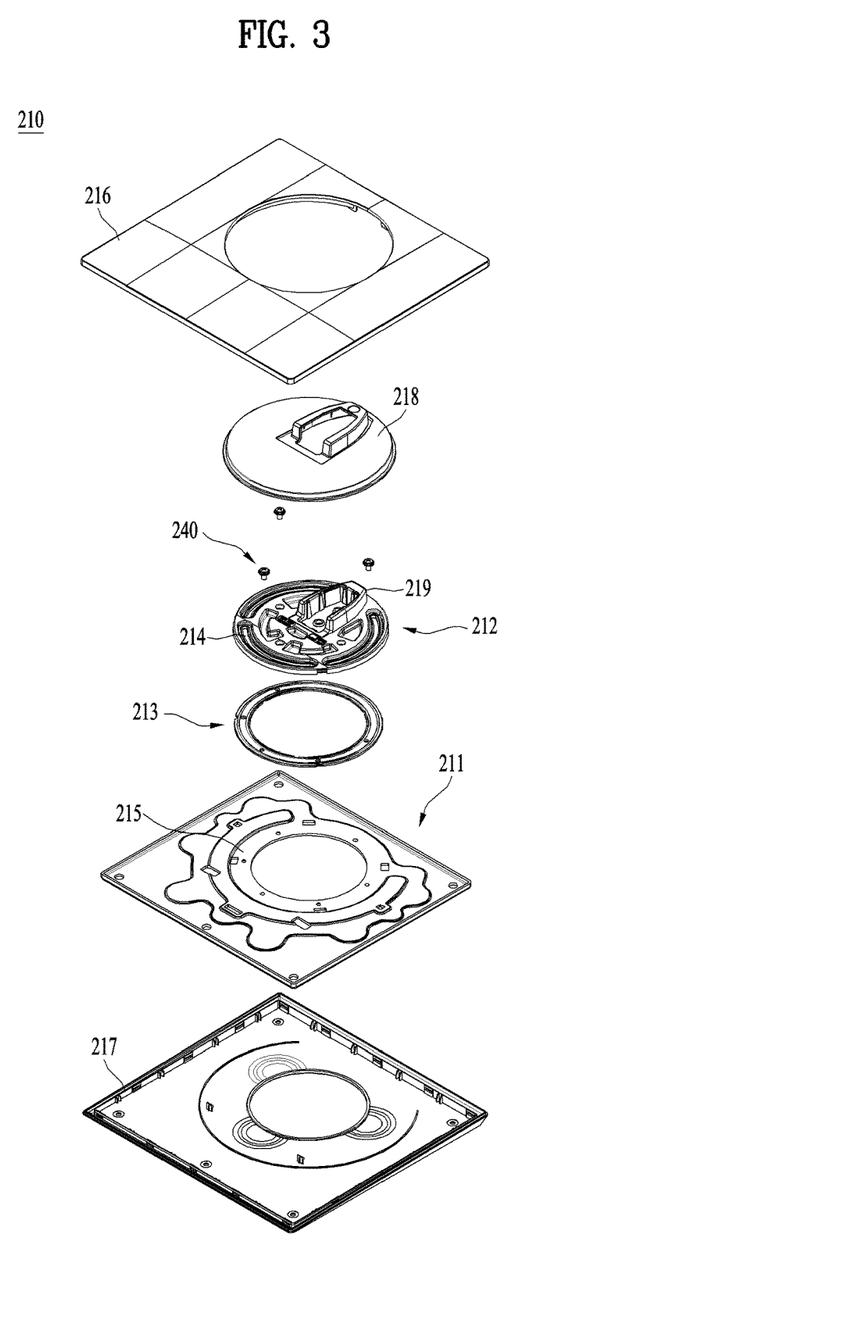
FIG. 3 is an exploded perspective diagram partially illustrating the stand.

FIG. 3 is an exploded perspective diagram partially illustrating the stand. 200.

The support portion 210 is configured to realize a rotatory structure so as to facilitate the swivel movement of the output unit (300, see FIG. 1). A support plate 211 is fixed to the floor and a swivel plate 212 is relatively rotary with respect to the support plate 211, to allow the output unit (300, see FIG. 1) to rotate together.

More specifically, the swivel plate 212 is provided in an upper end of the support plate 211 and horizontally rotatable with respect to the support plate 211.

The swivel plate 212 and the support plate 211 may serve as a frame of the stand 200. To secure the strength of the stand 200, the swivel plate 212 and the support plate 211 may include a material which satisfies a specific value or more of the strength. As one example, the swivel plate 212 and the support plate 211 may include a metallic material.

The swivel plate 212 is disposed on the support plate 211. The material properties of the swivel plate 212 and the support plate 211 might generate a large friction force between the plates during the rotation. Accordingly, a structure for reducing the friction force is necessary.

A lubricating pad 213 may be provided between the support plate 211 and the swivel plate 212 to minimize the friction force generated when the swivel plate 212 is rotating with respect to the support plate 211 to soften the rotation of the output unit 300.

The lubricating pad 212 may be formed of a material which is capable of reducing the friction force and easy to fabricate, with wear resistance. As a typical example, lubricating pad may include polyoxymethylene (POM) thermoplastic resin.

A lubricant is spread between the lubricating pad 213 and the swivel plate 212 to reduce the friction force more during the swivel movement.

The support plate 211 may include a seat guide portion 215 for guiding the seating of the lubricating pad 213. The support plate 211 and the lubricating pad 213 need to be coupled to each other by using a screw 240 which will be described later. The seat guide portion 215 functions as a guide of the stable coupling.

The swivel plate 212, the lubricating pad 213 and the support plate 211 may be coupled to each other by using one or more screws. One or more screws 240 are configured to prevent the swivel plate 212, the lubricating pad 213 and the support plate 211 from separating from each other vertically, by extension, to prevent the lubricating pad 213 and the support plate 211 from separating from each other horizontally.

Figure 4:
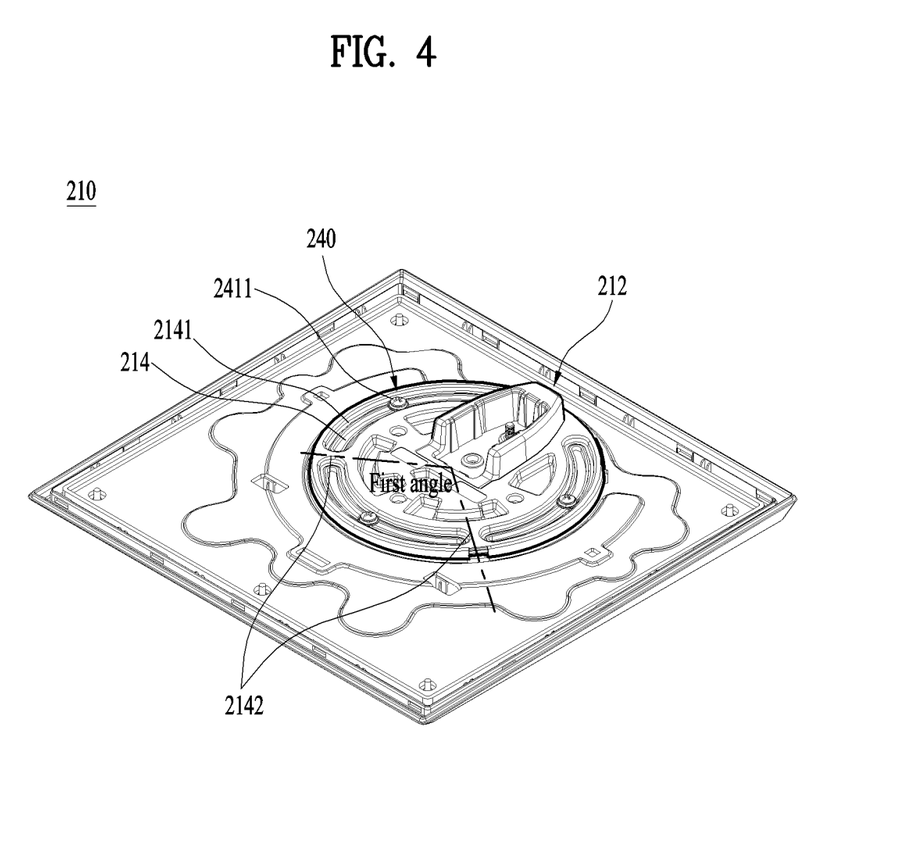
FIG. 4 is a perspective diagram partially illustrating a coupling state of a support portion in accordance with the present disclosure.

FIG. 4 is a perspective diagram partially illustrating a coupling state of the support portion 200 in accordance with the present disclosure.

The swivel plate 212 may include a guide hole 214 which provides a path of rotation which the screws 240 pass when the swivel plate 212 horizontally rotates. The guide hole 214 may be formed in a circular or a part of a circle shape to have the same diameter at the center of the swivel plate rotation with respect to the support plate 211.

When the swivel plate 211 is rotating, one or more screws 240 pass along the guide hole 214 so as to guide the swivel plate 212 to perform a predetermined rotation.

A screw head 2411 is movable and seated on a stepped lower part 2141 of the guide hole 214. The stepped lower part 2141 may prevent heads of the screws 240 from being more projected upwardly than an upper surface of the swivel plate 212.

The guide hole 214 may be formed within a range of a first angle with respect to the rotation center of the swivel plate 214 so as to suppress the output unit 300 and the neck portion 220 to rotate only in the range of the first angle.

When the swivel plate 212 is rotating, the screw head 2411 is moving in the stepped lower part 2141 of the guide hole 214 and then hooked to stepped upper parts 2142 which are formed in both sides of the guide hole 214 to rotate only within the first angle, so that the rotation of the swivel plate 212 can be suppressed.

Figure 5:
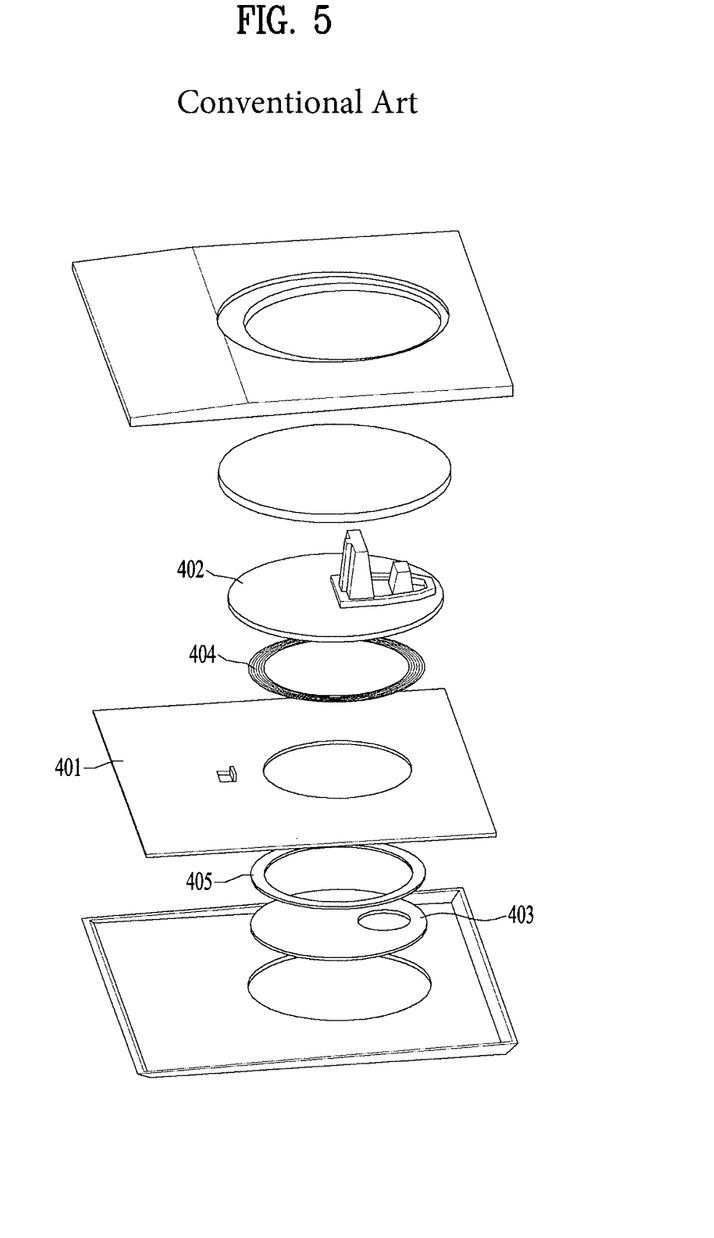
FIG. 5 is an exploded perspective diagram partially illustrating a conventional display device.

FIG. 5 is an exploded perspective diagram partially illustrating a conventional display device 100.

The conventional display device 100 includes a first member 401 configured to perform a similar function to the support plate (211, see FIG. 3); second and third members provided in both sides of the first member 401, respectively, and insertedly fitted to the first member 401 in a state of being secured to each other to rotate along a circular open edge of the first member 401.

In this instance, the structure of the second and third members 402 and 403 results in increasing the overall thickness and weight.

Moreover, an upper gasket 404 has to be provided between the second member 402 and the first member 401 and also a lower gasket 405 has to be provided between the third member 403 and the first member 401 unavoidably.

However, the swivel movement may be realized by using only the coupling of the two members and the screws 240 in the display device in accordance with the present disclosure, so that the simple structure, the weight loss and cost reduction may be possible.

Figure 6:
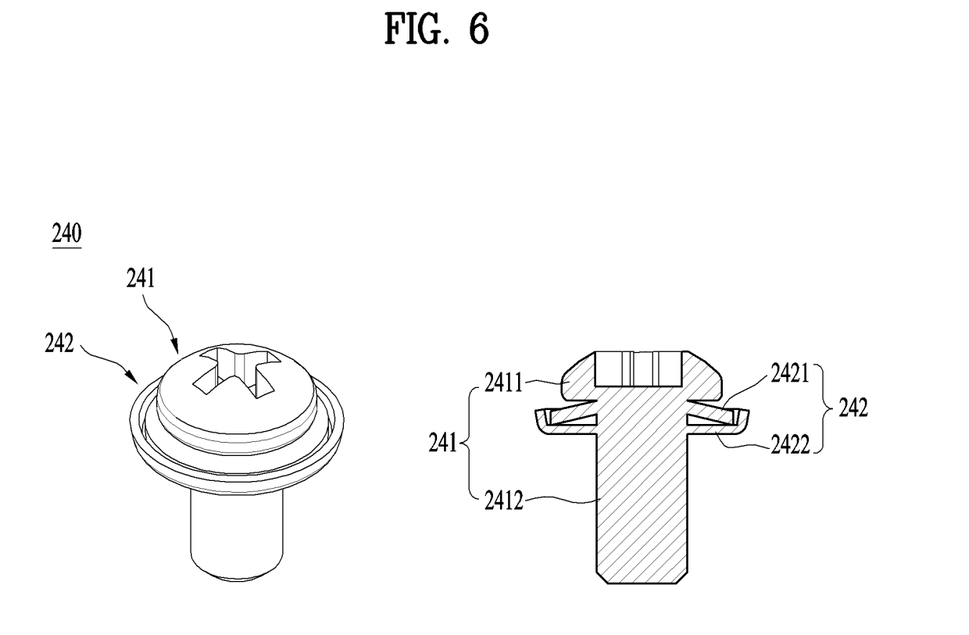
FIG. 6 includes a perspective diagram and a sectional diagram illustrating a screw in accordance with the present disclosure.

FIG. 6 includes a perspective diagram and a sectional diagram illustrating the screw 240 in accordance with the present disclosure.

The screw 240 may include a screw 242 and an adjusting washer 242.

As shown in FIG. 4, the screw 240 is employed to fasten the support plate 211 and the lubricating pad 213 to each other stably. A screw thread 2412 corresponding to the screw 240 may be formed in a screw fastening hole of the support plate 211.

In contrast, the screw 240 is not fasten to a screw thread 2412 of the swivel plate 212 and the width of the guide hole 214 is larger than a diameter of the screw thread 2412 to allow the swivel plate 212 to rotate loosely.

The screw head of the screw 240 which has a larger diameter than the screw thread 2412 is larger than the width of the guide hole 214 to prevent the swivel plate 212 from separating upwardly.

The adjusting washer 242 is provided between the screw head 2411 and the guide hole 214 and configured to dampen the friction force which might be directly generated between the screw head 2411 and the swivel plate 212.

The adjusting washer 242 may have a transformable shape which is pressable in a perpendicular direction. The adjusting washer 242 may include an upper plate 2421 and a lower plate 2422 which support each other, with a convex shape. The shape and material of the upper and lower plates 2421 and 2422 may facilitate the perpendicular pressing of the adjusting washer 242.

The adjusting washer 242 has a variable perpendicular width according to a pressing degree. When the screw 240 becomes loose, the adjusting washer 242 is configured to reduce the friction force for the swivel plate 212 to be rotated on the support plate 211 with a relatively weak force. When the screw 240 is fastened tight, the adjusting washer 242 is configured to increase the friction force for the swivel plate 212 to be rotated on the support plate 211 with a strong force.

The screw 240 having the adjusting washer may prevent vertical movement of the swivel plate 212 and the support plate 211 even in two cases.

Referring to FIG. 3 again, a support upper housing 216 and a support lower housing 217 are coupled to both surfaces of the support plate 211, respectively, to define the exterior. A support swivel housing 218 is coupled to the swivel plate 212 to define the exterior of the support portion 210 and configured to relatively move with respect to the support upper and lower housings 216 and 217.

The swivel plate 212 may include a neck coupling part 219 provided in the upper surface. The neck coupling part 219 may have a corresponding shape to a lower end of the neck portion 220 to be coupled to a lower end of the neck portion 220.

Figure 7:
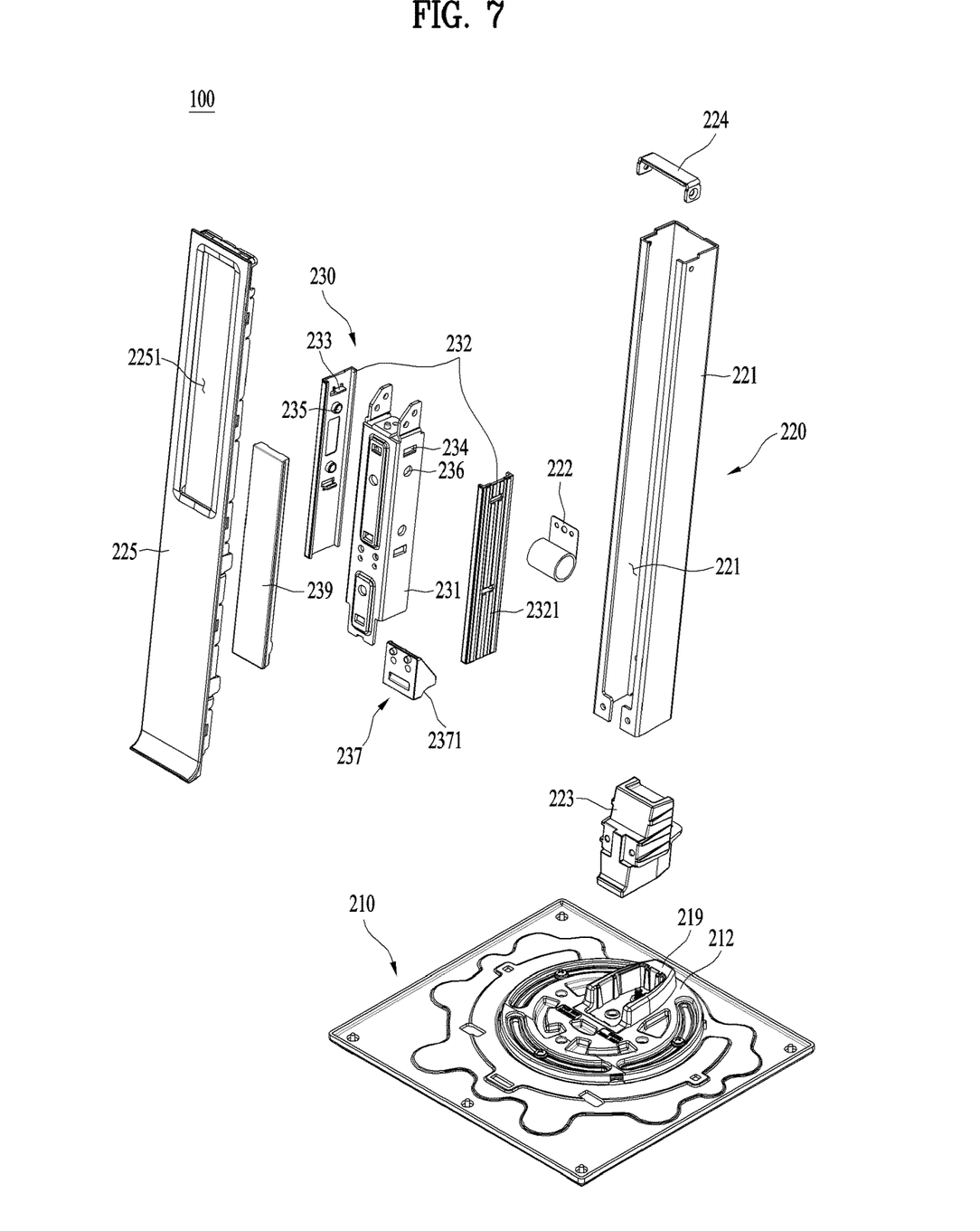
FIG. 7 is an exploded perspective diagram partially illustrating the display device.

FIG. 7 is an exploded perspective diagram partially illustrating the display device 100.

As mentioned above, the neck portion 220 is fixedly coupled to the support portion 210, especially, the swivel plate 212 and configured to adjust the height of the output unit 300. A support neck part 221 is coupled to the support portion 210 via a coupling case 223. More specifically, one side of the coupling case 223 is fixed to the neck coupling part 219 of the swivel plate 212 and the other side of the coupling case 223 is fixed to the support neck part 221. The fixing may be realized by screw-fastening.

The support neck part 221 may have a hollow 2211 formed to facilitate vertical movement of a height adjust portion 230.

The height adjust portion 230 having the output unit (300, see FIG. 1) secured to one side thereof is configured to vertically slide from the hollow 2211 of the support neck part 221.

The height adjust portion 230 may include a frame 231 and a lubricating rail 232. The frame 231 may form an entire frame of the height adjust portion 230 and the lubricating rail 232 may form a contact surface on which the height adjust portion 230 slide from the hollow 2211 of the support neck part 221.

Especially, the frame 231 may define a front surface and lateral surfaces of the height adjust portion 230.

The lubricating rail 232 may be coupled to right and left outer surfaces of the frame 231.

A spring guide 237 may be coupled to the frame 231 and formed in a corresponding shape to a plate spring 222 provided in the support neck part 221 so that the plate spring 222 can be spread in the spring guide 237.

Figure 8:
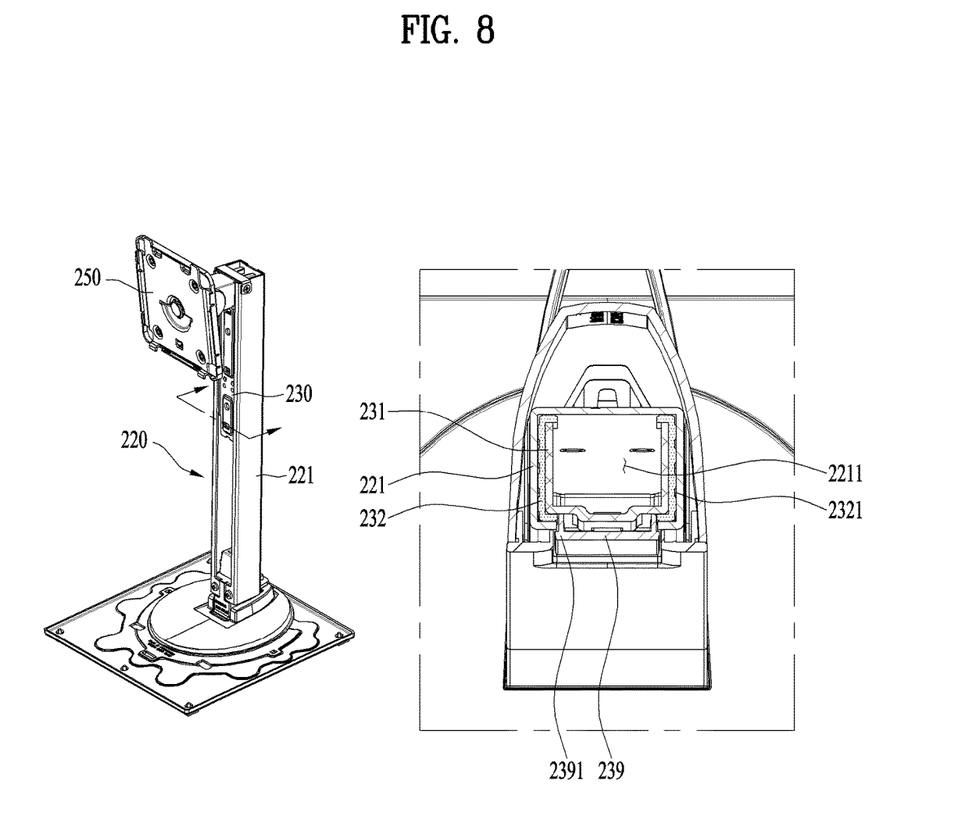
FIG. 8 is a perspective diagram partially illustrating a coupled state of the display device.

FIG. 8 is a perspective diagram partially illustrating a coupled state of the display device 100.

The lubricating rail 232 may form the right and left surfaces of the height adjust portion 230 to contact with right and left inner surfaces of the support neck part 221. The lubricating rail 232 may be configured to dampen the friction force which might be generated in the relative sliding movement between the height adjust portion 230 and the support neck part 221.

The lubricating rail 232 is formed of a material which is capable of reducing the friction force, with wear resistance, and easy to fabricate. As a typical example, lubricating pad may include polyoxymethylene (POM) thermoplastic resin.

Referring to a cross sectional rear of the neck portion 220, the right-and-left width of the height adjust portion 230 may be equal to that of the hollow 2211 formed in the support neck part 221.

The lubricating rail 232 is provided to cover not only the right and left surfaces of the height adjust portion 230 but also some area of front and rear surfaces of the height adjust portion 230.

Accordingly, the back-and-forth width of the hollow 2211 formed in the support neck part 221 may be equal to that of the height adjust portion 230, in contact with each other.

That characteristics may minimize a gap between the height adjust portion and the inner surface of the support neck part 221 not in the vertical direction, in other words, the right-and-left direction, only to prevent the movement of the height adjust portion 230 and gain a intended sufficient friction force.

Referring to FIG. 7 again, a height-adjust-unit front housing 239 is coupled to a front surface of the frame 231 and configured to define a front exterior of the neck portion 220. A groove is formed between lubricating rail 232 and both projection 2391 of the height-adjust-unit front housing 239. A front surface projection of the support neck part 221 is disposed in the groove to prevent a gap in the sliding movement and guide the sliding movement.

The lubricating rail 232 may be hooked to the frame 231. In case the lubricating rail 232 formed of the thermoplastic resin mentioned above, a hook 233 may be simply fabricated according to a shape of a mold and the hook 233 may be insertedly coupled to a hook hole 234 of the frame 231.

The hook structure may facilitate the coupling between the frame 231 and the lubricating rail 232, without auxiliary components. In addition, the hook structure may not result in increasing the overall volume advantageously.

To enhance the reliability of the coupling between the lubricating rail 232 and the frame 231, the lubricating rail 232 may include a boss 235. The frame 231 may have a boss guide 236 formed in a corresponding shape and location to the boss 235.

A lubricant is applied to an outer surface which is in contact with the frame 231 of the lubricating rail 232 to reduce the friction between the height adjust portion 230 and the support neck part 221 and help smooth sliding.

The lubricating rail 232 may include one or more stepped grooves 2321 formed in an outer lateral surface along a sliding direction of the height adjust portion 230. One or more stepped grooves 2321 may be arranged in plural vertical lines.

In an aspect of the friction force in the movement of neighboring two members in contact, line contact is more advantageous than surface contact, in other words, a small contact area is more advantageous than a large contact surface.

The stepped groove 2321 is employed to show a tendency to line contact by minimizing the contact area between the lubricating rail 232 and the support neck part 221 and provide a space for accommodating the applied lubricant, not flowing out.

The spring guide 237 may be configured to guide the plate spring 222 provided in the support neck part 221 to be unfolded or folded along the vertical movement of the height adjust portion 230.

A lower surface of the spring guide 237 may have a shape which contacts with an upper end of a foldable surface of the plate spring 222. In other words, the lower surface of the spring guide 237 may form a curved region 2371 corresponding to the foldable surface.

The plate spring 222 has an elastic property for returning to a folded state so as to provide a predetermined force which pushes the height adjust portion 230 upward.

Such the plate spring 222 is also employed to supplement the strength used in adjusting the height of the output unit 300 by the user supported to use a lot of strength because of the load of the height adjust portion 230 having the weight of the output unit 300 added thereto.

Factors which can influence the restoring force include the material, thickness and width of the plate spring 222. Considering the height of the output unit 300 and the weight of the height adjust portion 230, the user is able to adjust the height with the weakest strength. It is necessary to control the factors not to move the height adjust portion 230 unintendedly in a state where the user applies no strength.

An upper end fixing part 224 is fixed to an upper end of the support neck part 221. When sliding to the upper end, the height adjust portion 230 meets the upper end fixing part 224 not to be separated from the neck portion 220.

Figure 9:
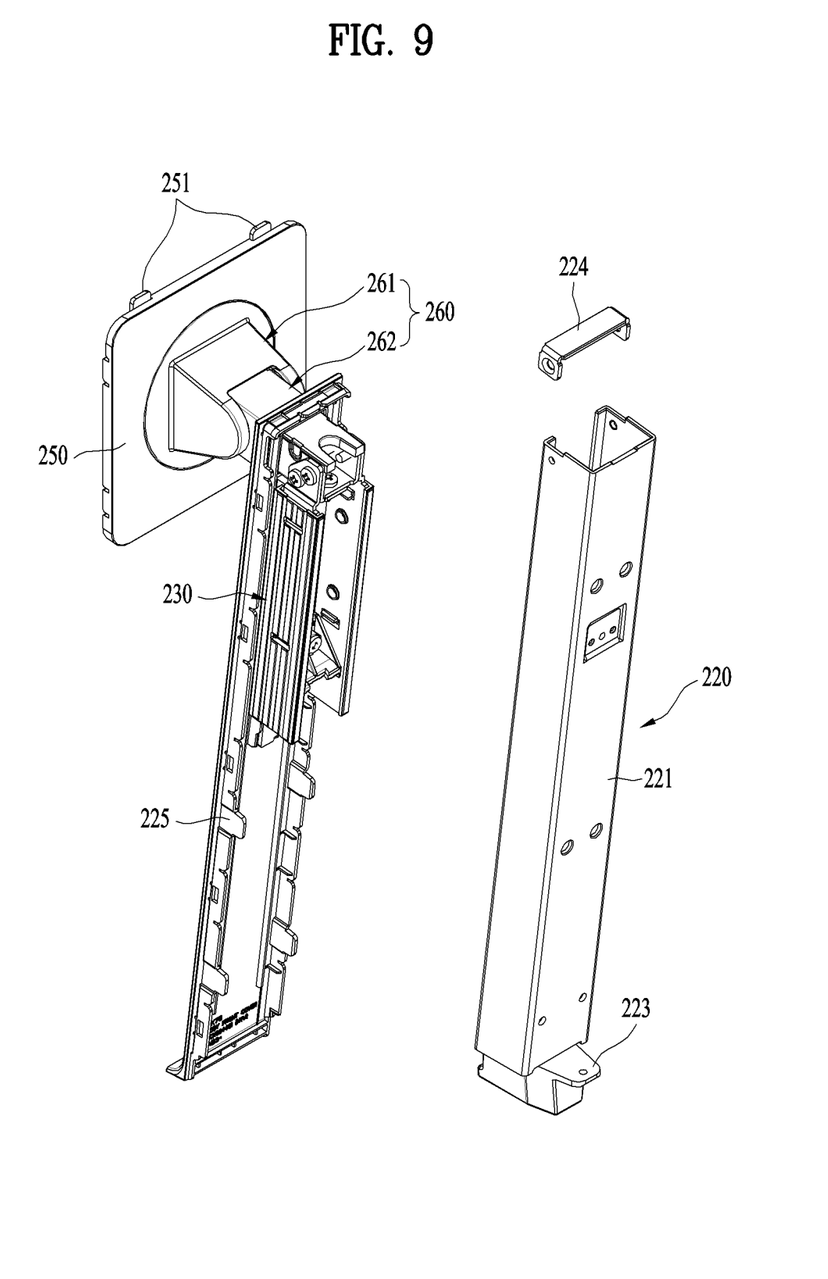
FIG. 9 is an exploded perspective diagram partially illustrating the display device.

FIG. 9 is an exploded perspective diagram partially illustrating the display device 100.

As mentioned above, the output unit 300 may be tiltingly movable. The output unit 300 is fixedly coupled to a display coupling portion 250.

The display coupling portion 250 is detachably coupled to the output unit 300 via a coupling part 251 projected there from. A coupling hole formed in the output unit 300 may be formed to slide in or out of the coupling part 251 to selectively couple the display coupling portion 250 to the output unit.

The display coupling portion 250 is connected with a first hinge part 261 and the first hinge part is hingedly connected with a second hinge part 262. The second hinge part 262 is fixedly coupled to the height adjust portion 230.

The first hinge part 261 and the second hinge part 262 may function as a tilting portion 260 configured to tilt vertically. The tilting portion 260 may facilitate the tilting of the display coupling portion 250 with respect to the height adjust portion 230.

The second hinge part 262 and the height adjust portion 230 may be fastened to each other by using a screw in the neck front surface housing 225 via an open hole 2252.

The three movements mentioned above may facilitate the swivel, height-adjusting and tilt movement of the output unit 300 combinedly.

Figure 10:
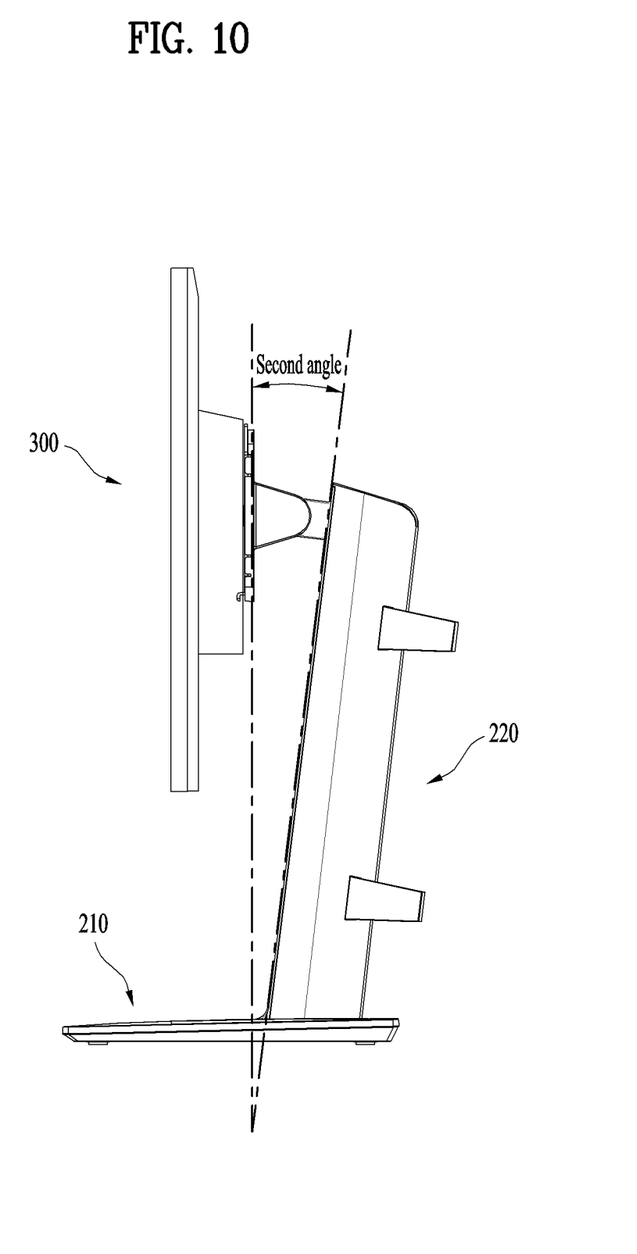
FIG. 10 is a side view of the display device.

FIG. 10 is a side view of the display device 100.

The neck portion 220 may be tilted a second angle backwardly with respect to a support surface of the support portion 210. When the neck portion 220 is tilting backwardly, it is possible to realize a small entire area of the support part 210 by the compensation of the weight center.

Various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A stand comprising:
a support plate;
a swivel plate provided in an upper end of the support plate and configured to horizontally rotate about a rotation center with respect to the support plate;
a lubricating pad provided between the support plate and the swivel plate and coupled to the support plate;
a screw configured to fasten the swivel plate, the lubricating pad and the support plate to each other; and
a guide hole formed in the swivel plate and configured to provide a rotation passage of the screw in the horizontal rotation,
wherein the guide hole is formed in a part of a circle shape in a range of a first angle with respect to the rotation center of the swivel plate and the swivel plate rotates only in the range of the first angle.

2. The stand of claim 1, wherein the screw comprises:
a screw head configured to suppress separation of the swivel plate; and
an adjusting washer provided between the screw head and the guide hole and configured to be pressable with respect to a perpendicular direction.

3. The stand of claim 1, further comprising:
a support neck part fixed to the swivel plate and forming a hollow; and
a height adjust portion having one side fixed to the output unit and configured to slidingly move with respect to the hollow of the support neck, and
wherein the height adjust portion comprises:
a frame defining front and lateral surfaces; and
a lubricating rail coupled to right and left outer surfaces of the frame, respectively, and contact with right and left inner surfaces of the support neck part.

4. The stand of claim 3, wherein the lubricating rail is provided to partially cover predetermined left and right regions of a front surface and predetermined left and right regions of a rear surface of the frame, and
the back-and-forth width of the hollow formed in the support neck part is equal to that of the height adjust portion.

5. The stand of claim 3, wherein the lubricating rail is hooked to the frame.

6. The stand of claim 3, further comprising:
a lubricant applied to an outer surface of the lubricating rail.

7. The stand of claim 3, wherein the lubricating rail comprises one or more stepped groove formed in an outer surface along a sliding direction.

8. The stand of claim 3, further comprising:
a plate spring provided in an inner back surface of the support neck part; and
a spring guide provided in an inner front surface of the height adjust unit and configured to contact with the plate spring.

9. The stand of claim 3, further comprising:
an upper end fixing part coupled to an upper end of the support neck part and configured to contact with the height adjust portion when the height adjust portion is sliding to the upper end upwardly.

10. The stand of claim 3, further comprising:
a display coupling portion rotatably coupled to the height adjust portion and configured to be tilting in a perpendicular direction.

11. The stand of claim 3, wherein the support neck part is tilted a second angle backwardly.

12. A display device comprising:
a support plate;
a swivel plate provided in an upper end of the support plate and configured to horizontally rotate with respect to the support plate;
a lubricating pad provided between the support plate and the swivel plate and coupled to the support plate;
a screw configured to fasten the swivel plate, the lubricating pad and the support plate to each other; and
a guide hole formed in the swivel plate and configured to provide a rotation passage of the screw in the horizontal rotation;
a support neck part fixed to the swivel plate and forming a hollow;
a height adjust portion configured to slide in the hollow of the support neck part;

a display coupling portion rotatably coupled to the height adjust portion and configured to be tilting in a perpendicular direction; and an output unit detachably coupled to the display coupling part.

13. The display device of claim 12, further comprising:

a coupling part projected from the display coupling portion.

14. A display device comprising:

a support neck part forming a hollow;

a height adjust portion configured to slide in the hollow of the support neck part;

a display coupling portion rotatably coupled to the height adjust portion and configured to be tilting in a perpendicular direction; and an output unit detachably coupled to the display coupling portion, wherein the height adjust portion comprises:

a frame defining front and lateral surfaces; and a lubricating rail coupled to right and left outer surfaces of the frame, respectively, and in contact with right and left inner surfaces of the support neck part, wherein the lubricating rail comprises one or more stepped groove formed in an outer surface along a sliding direction.

15. The display device of claim 14, wherein the lubricating rail is provided to partially cover predetermined left and right regions of a front surface and predetermined left and right regions of a rear surface of the frame, and a back-and-forth width of the hollow of the support neck part is equal to that of the height adjust portion.

16. The display device of claim 14, wherein the lubricating rail is hooked to the frame.

17. The display device of claim 14, further comprising:

a plate spring provided in an inner back surface of the support neck part; and a spring guide provided in an inner front surface of the height adjust portion and configured to contact the plate spring.

18. The display device of claim 14, further comprising:

an upper end fixing part coupled to an upper end of the support neck part and configured to contact the height adjust portion at an uppermost sliding position of the height adjust portion.

* * * * *